United States Patent [19]

Specktor

[11] Patent Number: 4,940,373
[45] Date of Patent: Jul. 10, 1990

[54] NUT AND BOLT LOCKING EMCHANISM

[75] Inventor: Gerald A. Specktor, St. Paul, Minn.

[73] Assignee: Shim-A-Line, Inc., Minneapolis, Minn.

[21] Appl. No.: 412,677

[22] Filed: Sep. 26, 1989

[51] Int. Cl.$^5$ .................. F16B 39/04; B62D 3/00
[52] U.S. Cl. ........................ 411/87; 411/91; 411/95; 411/121; 180/79; 403/320
[58] Field of Search .................. 411/87, 90-95, 411/97, 119-121, 927; 403/22, 320, 398, 399; 180/79, 79.4

[56] References Cited

U.S. PATENT DOCUMENTS

| | | | |
|---|---|---|---|
| 366,436 | 7/1887 | Sylvester | 411/90 |
| 2,405,424 | 8/1946 | Herreshoff | 411/927 |
| 2,431,735 | 12/1947 | Cyr | 411/87 |
| 3,582,118 | 6/1971 | Hogan | 403/320 |

*Primary Examiner*—Neill R. Wilson

*Attorney, Agent, or Firm*—Kinney & Lange

[57] ABSTRACT

A system of locking a pinch bolt assembly through a yoke arm of a vehicle steering assembly. The yoke arm of a steering assembly has an outward end, a forward face and a rearward face. A bolt receiving aperture through the yoke arm connects the forward face and the rearward face. A pinch bolt is fitted through the bolt receiving aperture to control the radius of an aperture for receiving an adjustment bushing. The head of the pinch bolt impinges against a selected one of the rearward and forward faces and a nut fitted to the bolt is tightened against the unselected face resulting in the head and nut pressing against their respective faces. A C-shaped channel section is fitted around the forward face, the rearward face and the outward end of the yoke arm. The channel section includes coaxial apertures fitted around the head of the bolt and the nut, respectively, for preventing the rotation of the nut and the bolt and thus preventing the nut and bolt from loosening.

13 Claims, 1 Drawing Sheet

NUT AND BOLT LOCKING EMCHANISM

BACKGROUND OF THE INVENTION

1. Field of the Invention.

The present invention relates generally to locking a nut and bolt fastener assembly and, more particularly, to a system for locking a pinch bolt assembly through the yoke of a motor vehicle steering assembly.

2. Description of the Prior Art.

Various rotatable adjusting bushings have been used to adjust castor and camber in wheeled vehicle steering mechanisms. Such steering mechanisms typically include a yoke carried at an end of a front axle. At least one arm of the yoke has an opening for receiving the adjusting bushing. A wheel spindle assembly is pivotally mounted on the yoke by ball joints having a stud extending through the opening in the yoke arm, in locking engagement with the bushing. The adjusting bushing displaces the associated ball joint from the axis of the exterior surface of the bushing. The orientation of the bushing within the opening determines the direction of the displacement, which is reflected as a change in the pivotal axis of the spindle and thus as changes in castor, camber or both.

Copending U.S. Patent Application Serial No. 104,323, filed Oct. 2, 1987, describes such a steering mechanism in connection with an adjustable bearing positioning system. Adjustable bearings have a cylindrical outer surface approximately equal in circumference with the bushing receiving opening. A shoulder extends from the top of the bushing and a slot extends vertically through the bushing and shoulder and radially outward from a vertical bore in the bushing. The shape of the bore mates with the stud in the opening. The bore is parallel to but offset from the central axis of the outer cylindrical surface. A further slot extends radially outward from the bushing receiving opening through the yoke arm. A bolt extending through the yoke arm and through the yoke arm slot cooperates with a nut for pinching the slot and thereby reducing the diameter of the bushing receiving opening for fixing the position of a bushing disposed in the opening.

Motor vehicles, among much other machinery, generate a great deal of vibration in use. Vibration tends to result in nuts coming loose from bolts. As the pinch bolt and nut assembly loosens, the taut grip of the bushing receiving opening on the bushing can loosen, resulting in potential loss of bushing adjustment and loss of castor and camber adjustment.

SUMMARY OF THE INVENTION

The present invention is a system of locking a nut and bolt assembly, and, more particularly, of locking a pinch bolt assembly through a yoke arm of a vehicle steering structure of the type having a yoke assembly, the yoke assembly having an opening for receiving a bushing assembly, and a ball joint secured to the yoke in cooperation with the bushing assembly, pivotally supporting a wheel spindle.

The yoke arm further includes a rearward face, a forward face and an outward end, all parallel to the axis of the bushing receiving opening in the yoke arm. The opening in the yoke is substantially cylindrical in shape with a radial slot extending from the opening to the outward end. A bolt receiving aperture extends through the yoke arm and the radial slot connecting the forward face and the rearward face.

A pinch bolt and nut assembly is fitted through the bolt receiving aperture for compressing the sides of the radial slot toward one another and thereby adjusting the radius of the bushing receiving opening. The head of the pinch bolt presses against a selected one of the rearward or forward faces and the nut fitted to the bolt presses against the unselected face. The pinch bolt assembly is tightened on itself to adjust the radius of the bushing receiving opening.

A C-shaped channel section including a middle section and opposed end sections is fitted to the yoke arm for preventing the pinch bolt assembly from loosening. The channel section includes a pair of opposed, parallel end sections spaced to fit snugly around the forward and rearward faces of the yoke arm at the appropriate degree of tightening of the pinch bolt assembly. A middle section of the channel extends between the forward and rearward faces along the outward end of the yoke arm connecting the end sections and preventing relative movement of the end sections with respect to one another. The middle section is bowed inwardly toward the outward end of the yoke arm to provide a spring which can be flexed to allow the channel to be introduced around the yoke arm, the nut and the bolt.

An aperture is provided through each end section of the C-shaped channel, each aperture being centered on an axis perpendicular to the end sections. The apertures are fitted snugly around the head of the bolt and the nut, respectively, for preventing the rotation of the nut and the bolt.

The middle section of the C-shaped channel further includes a semicircular edge with a chord parallel to the center axis of the apertures. The semicircular aspect of one edge of the middle section acts to prevent certain bending moments from actually bending the middle section affecting the orientation of one end section to another.

DETAILED DESCRIPTION OF THE PREFERRED EMBODIMENTS

Figure 1:
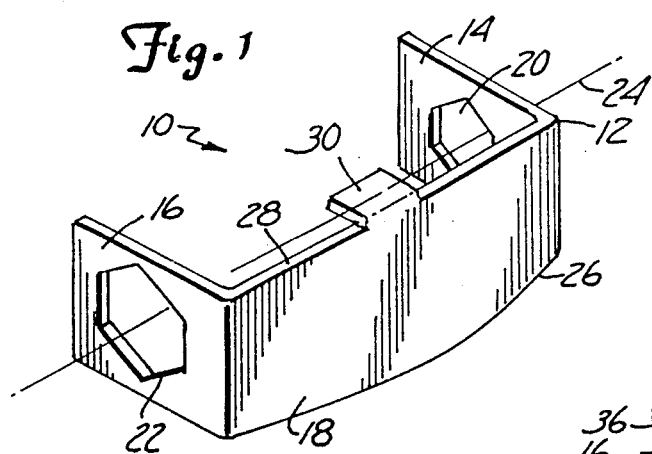
FIG. 1 is a perspective view of a preferred embodiment of a bolt and nut locking mechanism.

FIG. 1 illustrates an embodiment of the invention suitable for use in connection with motor vehicle steering mechanisms. Locking mechanism 10 includes a C-shaped channel body 12 formed from a single piece of metal. End section locking plates 14 and 16 extend in parallel and in the same direction from each end of an approximately rectangularly shaped middle section 1B.

End section locking plates 14 and 16 include locking apertures 20 and 22, respectively. Apertures 20 and 22 are hexagonally shaped and sized to fit snugly around selected size, hexagonal nuts and bolt heads. Apertures 20 and 22 are both centered on center axis 24, which is perpendicular to end section locking plates 20 and 22. Middle section 1B is a plate generally parallel to and spaced from center axis 24. Middle section IB, in the preferred embodiment, is somewhat elongated in the direction of axis 24 giving the section a rectangular appearance. An outwardly bowed semicircular edge 26 to middle section IB, having a chord running parallel to center axis 24, lends strength to the middle section for resisting certain bending moments applied to channel 12 perpendicular to central axis 24. Middle section edge 28, opposite semicircular edge 26, runs generally parallel to center axis 24 and has a center tab 30 which cooperates with the middle section IB for engaging the corner of a structure on which channel 12 rests.

Figure 2:
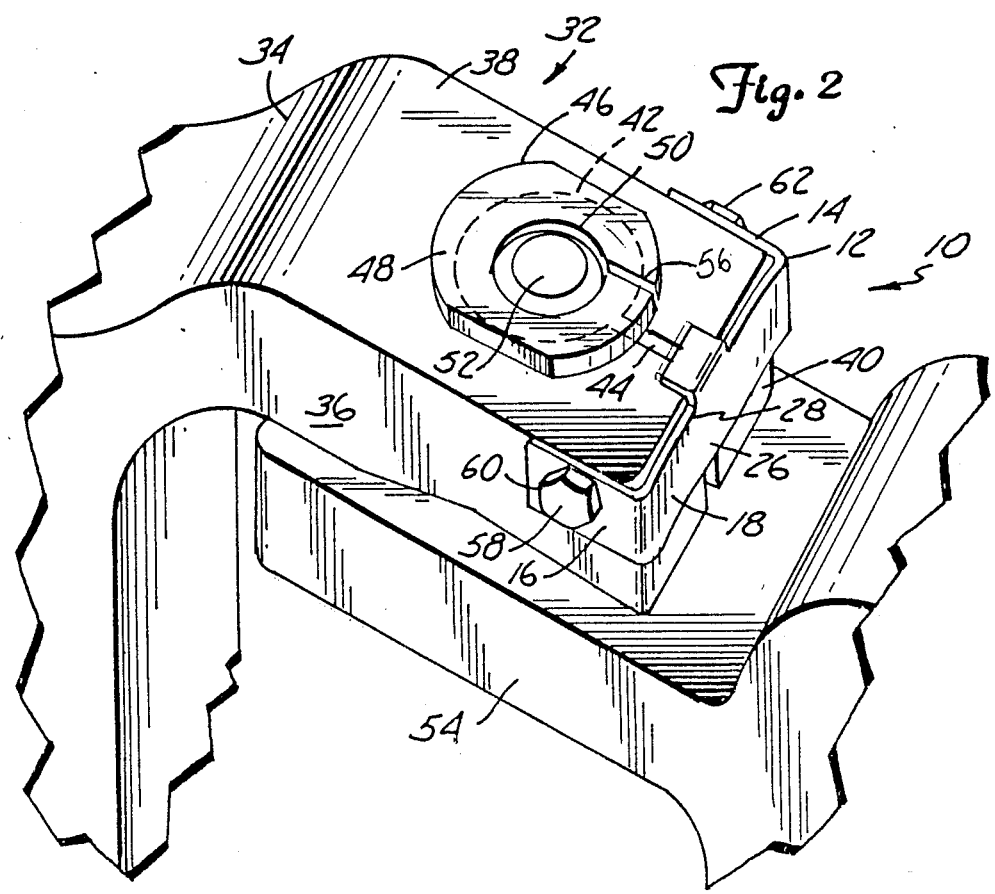
FIG. 2 a perspective view of the preferred embodiment of FIG. 1 of a bolt and nut locking mechanism positioned on a right front steering mechanism for a motor vehicle.

FIG. 2 illustrates the environment of application of the preferred embodiment of locking mechanism 10. An upper portion of a vehicle steering mechanism 32 from the right front portion of a vehicle includes an upper yoke arm 34. Upper yoke arm 34 has a rearward face 36, a forward face (not shown) opposite the rearward face, an upward face 38, a downward face (not shown) opposite the upward face, and an outer end 40. Upward face 38 has a bushing receiving opening 42, which is generally cylindrical in shape and extends vertically through yoke arm 34 to the downward face. A slot 44 also extends vertically through upper yoke arm 34 from upward face 38 to the downward face, extending radially outward from the axis of bushing receiving opening to outer end 40.

A bushing 46 is positioned in bushing receiving opening 42, having a shoulder 48 resting on upward face 38 of upper yoke arm 34. Bushing 46 has a cylindrical outer surface (not shown) sized to mate with bushing receiving opening 42. Bushing 46 has a cylindrical vertical bore 50, which is off center from but parallel to the axis of the outer cylindrical surface. Bushing 46 and shoulder 48 have a vertical slot 56 extending from vertical bore SO. A stud 52 extends upward from the ball of a ball joint assembly (not shown) supported on spindle arm 54 into bushing receiving opening 42 for mating with cylindrical vertical bore SO.

C-shaped channel 12 is fitted around upper yoke arm 38, reaching from end locking section 16 adjacent rearward face 36, along middle section 1B adjacent outer end 40, to end locking section 14 adjacent the forward face. Tab 30 reaches from middle section 1B over upward face 38. A bolt 58 is fitted through upper yoke arm 34 from the rearward face 36 to the forward face. A nut 62 is fitted to the distal end of bolt 58 from bolt head 60 and tightened against the forward face to press slot 44 together and to thereby reduce the diameter of bushing receiving opening 42. Bolt head 60 is hexagonally shaped and is bracketed on all six sides thereof by aperture 22 of channel 12. Similarly, nut 62 is hexagonally shaped and is bracketed on all six sides by aperture 20.

Middle section 1B is bowed inwardly along its center portion against outer end 40 to provide a spring on which locking plates 14 and 16 can be flexed or hinged outwardly. Flexing locking plates 14 and 16 outwardly allow apertures 20 and 22 of channel 12 to be fitted over bolt head 60 and nut 62 after the bolt and nut have been tightened to the desired degree.

Figure 3:
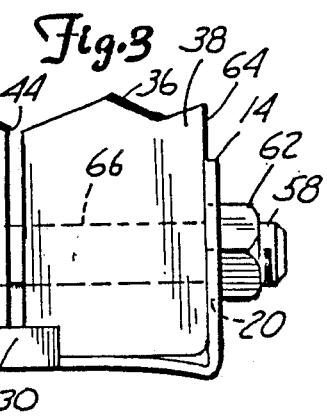
FIG. 3 is a top view of the bolt and locking mechanism positioned on the yoke of a steering mechanism.

FIG. 3 illustrates in top view the relative orientation of C-shaped channel 12 and bolt 58 with respect to upper yoke arm 34. Bolt 58 is introduced through bore 66 which extends from rearward face 36 forward through vertical slot 44 to forward face 64. Bolt head 60 and nut 62, which is fitted to bolt 58, press against rearward face 36 and forward face 64, respectively, as nut 62 is tightened down on the bolt. The interior flats of apertures 14 and 16 abut against the outer surfaces of hexagonal bolt head 60 and nut 62, preventing the nut/bolt assembly from rotating in bore 66 and the nut from rotating against bolt 58. Tab 30 is positioned against upward face 38 to control movement of channel 12. It will be obvious to those skilled in the art that middle section 1B and tab 30 can be modified for bracing end locking portions 4 and 16 around structures of numerous different shapes. The inward curve of middle section 1B is also apparent.

The bolt and nut locking mechanism provides an inexpensive system for locking a nut to a bolt. In motor vehicle steering systems, the ability to lock camber and castor will provide considerable savings to motor vehicle owners through less frequent requirement of alignment and reduced tire wear resulting from misalignment.

Although the present invention has been described with reference to preferred embodiments, workers skilled in the art will recognize that changes may be made in form and detail without departing from the spirit and scope of the invention.

What is claimed is:

1. A nut and bolt locking mechanism comprising:
   first and second locking plates;
   means for holding the first and second locking plates in fixed positions with respect to one another; and
   the first and second locking plates having coaxial openings, the opening through the first locking plate being shaped and sized to fit the head of a selected type of bolt and the opening through the second locking plate being shaped and sized to fit a selected type of nut.

2. The nut and bolt locking mechanism of claim 1 wherein the holding means further comprises:
   an elongated plate connected to and extending between the first and second locking plates substantially parallel to the axis of the openings through the locking plates and substantially perpendicular to the locking plates.

3. The nut and bolt locking mechanism of claim 2 wherein the holding means further comprises:
   an outwardly bowed semicircular elongated edge of the elongated plate between the locking plates.

4. The nut and bolt locking mechanism of claim wherein the holding means provides a spring hinge between the locking plates allowing the locking plates to be flexed outwardly from or inwardly toward one another.

5. A C-shaped channel section for locking a nut fitted a bolt, the channel section comprising:
   a middle section;
   opposed end sections extending substantially parallel to one another and substantially perpendicular to the middle section from the middle section;
   an aperture through each end section, one aperture being sized and shaped to snugly fit around the head of a bolt and the second aperture being sized and shaped to snugly fit a nut; and
   the apertures being centered on an axis.

6. The C-shaped channel section of claim 5 wherein the middle section includes a plate having at least a first semicircular edge, the semicircular edge having a chord spaced from and substantially parallel to the center axis of the apertures.

7. The C-shaped channel section of claim 6 wherein the middle section further includes an edge of the plate spaced from and substantially parallel to the chord of the semicircular edge.

8. The C-shaped channel section of claim 5 wherein the middle section provides a torsion spring connecting the opposed end sections permitting the opposed end sections to be flexed outwardly from the inwardly toward one another.

9. A system of locking a pinch bolt assembly through a yoke arm of a vehicle steering assembly, the system comprising:

the yoke arm having an outward end, a forward face and a rearward face;

a bolt receiving aperture through the yoke arm connecting the forward face and the rearward face;

a pinch bolt being fitted through the bolt receiving aperture, the pinch bolt having a head pressing against a selected one of the rearward or forward faces;

a nut pressing fitted to the bolt to form the pinch bolt assembly and tightened against the unselected face;

a C-shaped channel section including a middle section and opposed end sections, the channel section being fitted to the yoke arm such that the and sections snugly fit around the forward and rearward faces of the yoke arm and the middle section extends between the forward and rearward faces along the outward end of the yoke arm preventing relative movement of the end sections with respect to one another; and apertures through the end sections centered on an axis through the end sections, the apertures being fitted around the head of the bolt and the nut respectively for preventing the rotation of the nut or the bolt.

10. The locking system of claim 9 wherein the middle section of the C-shaped channel further includes an outwardly bowed semicircular edge with a chord substantially parallel to the center axis of the apertures.

11. The locking system of claim 10 wherein the middle section includes a tab substantially perpendicular to the outward end of the yoke arm and extending around an edge of the outward end for fixing the position of the channel on the yoke arm.

12. The locking system of claim 9 wherein the middle section of the C-shape further includes an inward bow providing a torsion spring connecting the opposed end sections and permitting the opposed end sections to be flexed outwardly from and inwardly toward one another.

13. A method of securing a pinch bolt assembly in a yoke arm of a motor vehicle steering assembly, comprising the steps of:

positioning a pinch bolt having a head through a pinch bolt receiving aperture in the yoke arm;

fitting a nut to the pinch bolt and tightening the nut and pinch bolt head against the yoke arm to the desired degree; and fitting an open faced channel around the yoke arm and over the nut and the pinch bolt for preventing rotation of the pinch bolt in the receiving aperture and rotation of the nut on the pinch bolt.

* * * * *

UNITED STATES PATENT AND TRADEMARK OFFICE
CERTIFICATE OF CORRECTION

PATENT NO. : 4,940,373
DATED : July 10, 1990
INVENTOR(S) : Gerald A. Specktor

It is certified that error appears in the above-identified patent and that said Letters Patent is hereby corrected as shown below:

ON TITLE PAGE: [54], delete "EMCHANISM", insert "MECHANISM".

Col. 4, line 43, delete "claim", insert --claim 1--

Col. 4, line 48, after "fitted", insert --to--

Col. 5, line 4, delete "the", insert --and--

Col. 5, line 21, delete "and", insert --end--

Signed and Sealed this

Tenth Day of September, 1991

Attest:

*Attesting Officer*

HARRY F. MANBECK, JR.

*Commissioner of Patents and Trademarks*